April 21, 1942.   E. F. LOWEKE   2,280,154
ADJUSTER FOR FRICTION ELEMENTS
Filed Aug. 16, 1940
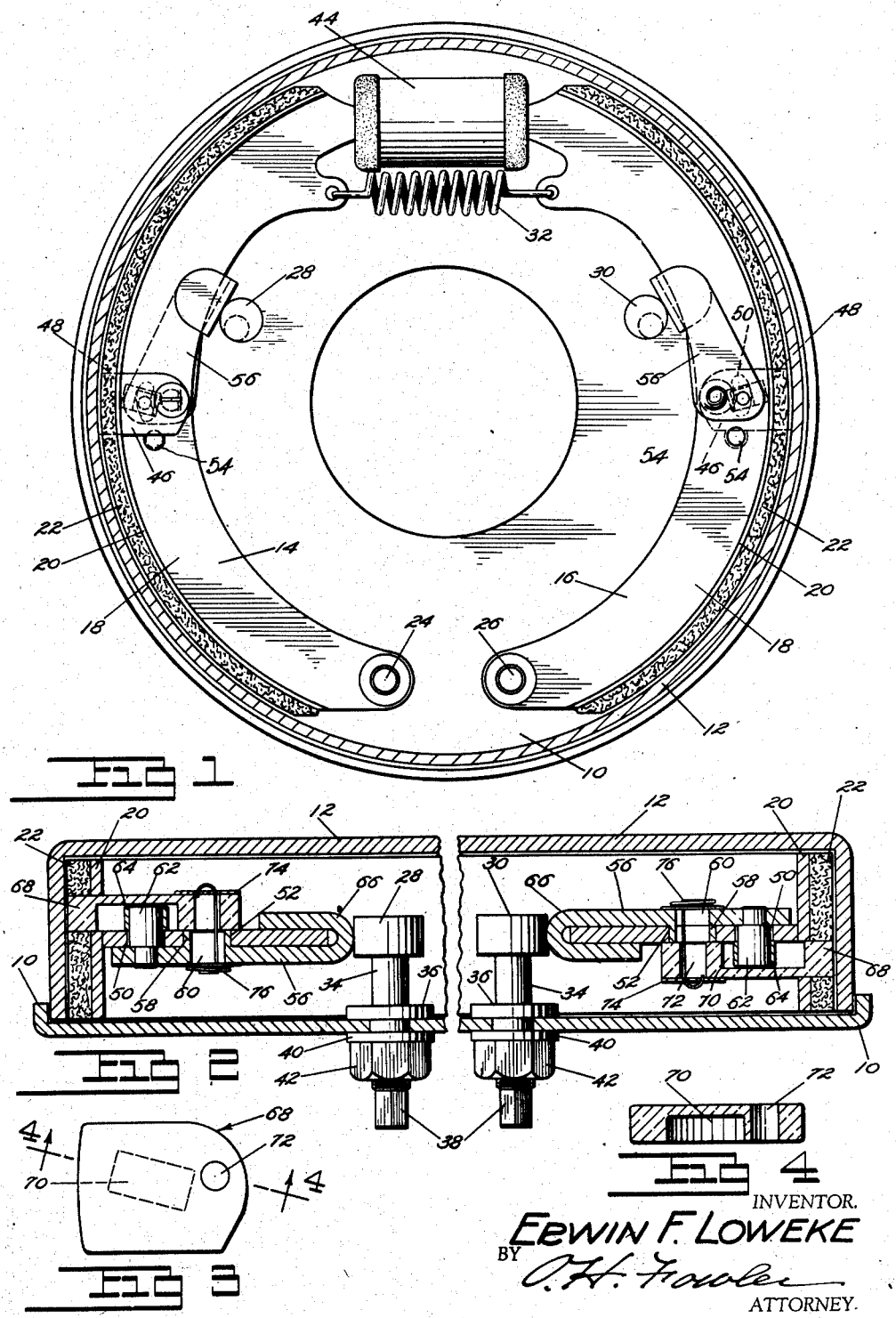
INVENTOR.
ERWIN F. LOWEKE
BY
ATTORNEY.

Patented Apr. 21, 1942

2,280,154

UNITED STATES PATENT OFFICE 2,280,154

ADJUSTER FOR FRICTION ELEMENTS

Erwin F. Loweke, Detroit, Mich., assignor to Hydraulic Brake Company, Detroit, Mich., a corporation of California Application August 16, 1940, Serial No. 352,978
In Canada December 1, 1939

12 Claims. (Cl. 188—79.5)

This invention relates to brakes, and more specifically to automatic adjusters for the friction elements thereof.

Broadly, the invention comprehends means for automatically adjusting the friction elements or shoes of an internal expanding brake to compensate for wear on the linings of the shoes due to repeated braking operations.

Means for automatically adjusting the friction elements or shoes of a brake to compensate for wear on the linings of the shoes are well known to those familiar with this art and it is generally understood that such means have not proved entirely satisfactory. This is true principally in such means wherein the operation is dependent upon a differential of wear on the friction linings of the shoes and a member frictionally clamped to the shoes and adapted for cooperation with the drum, and an adjustable retractile stop for maintaining the shoes in proper spaced relation to the drum, when the brake is at rest.

It is generally understood that in this type of automatic adjusting means, a considerable force is required to move the frictionally clamped members relative to the shoes. It is also understood that because of the tension of the retractile spring connecting the shoes, there is a tendency to displacement of the frictionally clamped members when the shoes are returned to their retracted position. Accordingly, it becomes necessary for the frictional resistance to movement of the members to exceed the load on the retractile stops, otherwise an underadjustment would result. It is the aim of the present invention to overcome this objection.

An object of the invention is to provide means for automatically adjusting the friction elements or shoes of a brake to compensate for wear on the frictional linings of the shoes.

Another object of the invention is to provide means for automatically adjusting the friction elements or shoes of a brake so operative as to avoid improper adjustment of the friction elements.

Another object of the invention is to provide means for automatic adjustment of the friction elements or shoes of a brake operative to avoid underadjustment of the friction elements.

A feature of the invention is a member supported on a friction element movable relative thereto and cooperating with a drum and an adjustable retractile stop and means interposed between the member and the stop for inhibiting retrograde movement of the member.

Another feature of the invention is a non-frictional member of impervious material, preferably a ceramic member of fine texture and high compressive strength having a rectangular recess diagonally disposed with relation to the profile of the member adapted to slidably receive a rectangular sleeve rotatable on a pin carried by the force transmitting end of a lever and completely housing the pin and rectangular sleeve so as to eliminate dust and other foreign substances.

Further objects and features of the invention will appear from the following description taken in connection with the drawing forming a part of this specification and in which:

Fig. 1 is a vertical sectional view of a brake taken just back of the head of the drum illustrating the invention as applied, Fig. 2 is a sectional view substantially on line 2—2, Fig. 1, Fig. 3 is a top plan view of the ceramic block or drum engaging member, and Fig. 4 is a sectional view substantially on line 4—4, Fig. 3.

Referring to the drawing for more specific details of the invention, 10 represents a fixed support or backing plate. Associated with the backing plate is a rotatable drum 12 and a pair of corresponding interchangeable friction elements or shoes 14 and 16 is mounted on the backing plate for cooperation with the drum.

As shown, the shoes are of conventional type each including a web 18 supporting a rim 20 having suitably secured thereto frictional lining 22. The shoes 14 and 16 have their articulate ends pivotally mounted on spaced anchors 24 and 26 positioned on the backing plate, and corresponding adjustable retractile stops 28 and 30 also positioned on the backing plate support the shoes in proper spaced relation to the drum, when the brake is at rest.

A retractile spring 32 connecting the shoes 14 and 16 serves to return the shoes to the stops 28 and 30 upon conclusion of a braking operation and to retain the shoes on the stops when the brake is at rest. Each of the stops includes a shaft 34 rotatable in the backing plate 10. The shaft has thereon a collar 36 abutting the backing plate and flaps 38 on its free end for the reception of an adjusting tool. A washer 40 is sleeved on the shaft and a nut 42 threaded on the shaft serves to secure the assembly in the adjusted position.

A fluid pressure actuated motor 44 of conventional type mounted on the backing plate between the shoes 14 and 16 and adapted to be connected to a suitable source of fluid pressure is operated to actuate the shoes into engagement with the drum against the resistance of the retractile spring 32.

Mounted on the shoes in reverse position are automatic adjusters indicated generally at 46. As shown, the rims and the linings of the shoes are slotted as at 48. The webs of the shoes have arcuate slots 50 and transverse bores 52, and arranged on the webs are guide pins 54. Each of the adjusters includes a lever 56 having as its fulcrum a laterally extending sleeve 58 coextensive with a bore 60 through the lever and this sleeve is fitted for rotation in the bore 52 in the web of the shoe.

A pin 62 on one end of the lever extends through the arcuate slot 50 and loosely sleeved on this pin is a washer 64 having a rectangular perimeter, the object of which will hereinafter appear. The force receiving end of the lever is bent parallel to the bodied portion thereof to provide a driver 66 suitable for engagement with the associated adjustable retractile stop and also to embrace the web of the shoe to inhibit rattling of the assembly.

A block 68 of impervious non-frictional material has therein a diagonally disposed rectangular recess or slot 70 and a transverse bore 72 adjacent one corner of the slot. One end of the block has a radius commensurate with the radius of the shoe and this end of the block is fitted for movement in the slot 48 through the rim and lining of the shoe and is adapted to engage the drum. The diagonal slot 70 in the block receives the rectangular washer 64 on the pin 62 carried by the lever 56, and the bore 72 in the block registers with the bore 60 in the lever and the coextensive sleeve 58 and one edge of the block slidably engages the guide pin 54 on the web of the shoe. A light plate 74 flapped against the back of the block 68 over the bore 72 has secured thereto a spring 76 superimposed on the lever 56. This spring serves to frictionally clamp the block to the web of the shoe.

Because of the differential in the coefficient friction of the lining on the shoe and the block, in a normal braking operation there is relative movement between the shoe and the block. This movement of the block is proportionate to wear on the lining on the shoe and is transversely of the shoe against the resistance imposed by the spring 76, and during this movement the rectangular washer 64 in the diagonal slot 70 in the block slides in the slot, and this movement of the washer transmits force to the lever causing slight movement of the lever on its fulcrum so that upon conclusion of a braking operation and return of the shoe to retracted position, the lever engages the retractile stop and supports the shoe in proper spaced relation to the drum. Because of the wedging action on the block between the guide pin 54 and the rectangular washer 64 on the pin 62 carried by the lever, retrograde movement of the block is inhibited. This is of vital importance because of the tendency to maladjustment of the brakes due to the snapping action of the retractile spring 32 connecting the shoes upon release of the brake at the conclusion of a braking operation.

To reduce wear on the drum to the minimum, the adjusters are arranged in reverse position with respect to one another so that in a given brake structure the wear on the drum may be spread over substantially twice the area of a drum structure wherein adjusters are arranged in diagrammatically opposite position to one another. This has another highly important advantage in that the adjusters may be alike in structure and accordingly the cost of production may be greatly reduced.

Wear on the drum is further and very materially reduced by the introduction of a drum engaging member of the character of the block 68. This block is made from impervious non-frictional material preferably a ceramic of fine texture, durable, high compressive strength, substantial, and wear resistant. In practice, the face of the block engaging the drum becomes impregnated with fine metallic particles and this results in polishing the face of the block to such a high degree that the abrasive properties of the block are reduced to a minimum.

It is to be clearly understood that applicant does not limit himself to any particular ceramic in the production of the drum engaging member or block. However, it is important that such ceramic as may be employed must be durable and substantial so as to withstand the shock and strain imposed thereon in brake structures.

In a normal operation, upon energization of the motor 44, the shoes 14 and 16 are moved into engagement with the drum 12 against the resistance of the retractile spring 32 effectively retarding rotation of the drum. During this operation, the respective assemblies of the automatic adjusters 46 and the shoes 14 and 16 move as a unit.

Further movement of the shoes 14 and 16 into the drum 12 results from wear on the linings of the shoes due to successive engagement of the shoes with the drum. There is no undue unit pressure exerted on the block 68 in comparison to the unit pressure on the shoes, the wear on the drum engaging portion of the block is nil as compared to the wear on the linings 22 of the shoes, and this relative movement results between the blocks 68 and the shoes 14 and 16.

Movement of the blocks 68 is restricted to paths transversely of the shoes 14 and 16 by guide pins 54 on the webs of the shoes. Upon wear of the linings 22, the shoes are caused to assume new positions relative to the block 68 and the levers 56. The movement of the blocks 68 upon wear of the linings 22 results in transmission of force through the rectangular washer 64 and the pin 62 to the right hand lever 56 in Fig. 1 causing counter-clockwise motion of the lever. Hence, when the driving arm 66 on the lever engages the associated stop, the shoe is supported in a newly adjusted position in proper spaced relation to the drum, ready for further braking operations.

Extremely small pressure is required to move the blocks 68 inwardly; whereas, outward movement is inhibited due to the frictional resistance imposed by the spring 76, and movement of the block when the brake is at rest is inhibited due to the wedging action on the block between the guide pins 54 and the rectangular sleeve 64 on the pin 62; hence, the tension of the spring 32 connecting the shoes does not result in maladjustment of the block.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a movable member, a friction element for cooperation therewith, a stop for the friction element, a member carried by and movable transversely of the friction element having a slot therein angularly disposed to the path of movement of the member, and a lever fulcrumed on the friction element having a part received by the slot and another part for cooperation with the stop.

2. A brake comprising a movable member, a friction element for cooperation therewith, a stop for the friction element, a member adapted to engage the movable member carried by and movable transversely of the friction element having a slot therein angularly disposed to the path of movement thereof, and a lever fulcrumed on the friction element having a part received by the slot and another part for cooperation with the stop.

3. A brake comprising a rotatable drum, a friction element for cooperation therewith, a stop associated with the friction element, a drum engaging member carried by and movable transversely of the friction element having a rectangular slot therein disposed angularly to the path of movement of the member, a lever fulcrumed on the friction element, a rectangular sleeve connected to the lever and slidable in the slot, and means on the other end of the lever for cooperation with the stop.

4. A brake comprising a rotatable drum, a friction element for cooperation with the drum, a stop for the friction element, a drum engaging member frictionally supported on, carried by, and movable transversely on the element having a recessed face, a lever pivotable on the element having a part received by the recessed face and actuated by the movement of the member, and means on the lever for engagement with the stop.

5. A brake comprising a fixed support, a rotatable drum associated therewith, a friction element on the support for cooperation with the drum including a rim and web portion, a retractile stop for the element, a drum engaging member carried by and movable transversely on the element, a lever pivotable on the element having a part adapted to engage an angularly disposed part of the member, a driver on the lever having a hooked end embracing the friction element and adapted to engage the stop, and means for retaining the lever and member on the element.

6. A brake comprising a fixed support, a rotatable drum associated therewith, a friction element on the support having a lining for cooperation with the drum, a retractile stop for the element, means for actuating the element, a drum engaging member of impervious material carried by and movable transversely on the element having a rectangular slot therein disposed angularly to the path of movement of the element, a lever fulcrumed on the friction element, a driver on the lever adapted to engage the stop, a rectangular member slidable in the slot, means connecting the rectangular member to the lever, and means retaining the member and lever on the friction element.

7. A brake comprising a backing plate, a rotatable drum associated therewith, a friction element pivoted on the backing plate for cooperation with the drum, adjustable retractile stops for the elements, a retractile spring for the elements, hydraulic means for actuating the elements, a drum engaging member frictionally held on, movable transversely of and carried by the respective elements having a rectangular slot therein angularly disposed to the path of movement of the member, a lever fulcrumed on each of the friction elements having drivers adapted to engage the stops, and a rectangular member slidable in each of the slots and connected to the levers.

8. A brake comprising a rotatable drum, a friction element for cooperation with the drum, an adjustable retractile stop for the friction element, a drum-engaging member frictionally held on, carried by, and movable transversely of the friction element, a lever fulcrumed on and frictionally clamped to each of the elements, driving connections between the drum-engaging member and lever, and means on the lever for engaging the stop including a hooked portion adapted to embrace the element adjacent the stop.

9. A brake comprising a rotatable drum, a friction element for cooperation with the drum, a stop for the friction element, a drum-engaging member supported for movement on the element having a recessed face including parallel sides, a lever pivotally mounted on the member having a part received by the recessed face and engaging the sides, and means on the lever for engagement with the stop.

10. A brake comprising a movable member, a friction element for cooperation therewith including a rim and web portion, an adjustable retractile stop for friction elements, a member adapted to engage the movable member carried by and movable transversely of the friction element having a recess therein, and a lever fulcrumed on the friction element having a part received by the recess and another part for cooperation with the stop, said recessed face of the block bearing on the web of the shoe.

11. A brake comprising a fixed support, a rotatable drum associated therewith, a pair of friction elements for cooperation with the drum including rim and web portions, retractile stops for the element, drum engaging members carried by and movable transversely on the elements, levers pivotable on the elements having a part adapted to engage an angularly disposed part of the members, drivers on the levers including hooked ends embracing the webs of the shoes and adapted to engage the stops, said hooked ends being disposed on opposite sides of the web of the shoe with relation to one another, and means retaining the lever and member on the element.

12. A brake comprising a rotatable drum, a friction element for cooperation with the drum, a retractile stop for the element, a drum-engaging member carried by the friction element and movable transversely of the drum having a recessed face including sides angularly disposed to the transverse movement of the member, a lever pivotally mounted on the element having a part adapted to engage the sides of the recessed face, and means on the lever engaging the stop.

ERWIN F. LOWEKE.